(12) United States Patent
Hughes

(10) Patent No.: US 7,494,543 B2
(45) Date of Patent: Feb. 24, 2009

(54) CONCRETE COMPOSITIONS

(76) Inventor: Felix A. Hughes, 1 Lodge Lane, Chalfont St Giles, Buckinghamshire HP8 4AQ (GB)

(*) Notice: Subject to any disclaimer, the term of this patent is extended or adjusted under 35 U.S.C. 154(b) by 632 days.

(21) Appl. No.: 11/084,186

(22) Filed: Mar. 21, 2005

(65) Prior Publication Data

US 2006/0207479 A1 Sep. 21, 2006

(51) Int. Cl.
*C04B 7/13* (2006.01)
(52) U.S. Cl. .............. 106/644; 106/705; 106/713; 106/724; 106/737; 106/823; 106/DIG. 1
(58) Field of Classification Search ........... 106/644, 106/705, 713, 724, 737, 823, DIG. 1
See application file for complete search history.

(56) References Cited

U.S. PATENT DOCUMENTS

| 6,080,234 A | 6/2000 | Clavaud et al. |
| 6,478,867 B1 | 11/2002 | Cheyrezy et al. |

FOREIGN PATENT DOCUMENTS

EP   0 934 915   8/1999

*Primary Examiner*—Paul Marcantoni
(74) *Attorney, Agent, or Firm*—Stites & Harbison PLLC; Marvin Petry

(57) ABSTRACT

A concrete for making articles such as fixtures, furniture and other accoutrements having high compressive and resistive strengths, good machining, cutting and abrasion resistance properties and an aesthetically pleasing finish. This concrete is obtained through mixing a composition comprising hydraulic binder, aggregate, pozzolan, a dispersant, fibers, a pozzonically reactive and/or inert filler, water and preferably a non-chloride set accelerator.

17 Claims, No Drawings

CONCRETE COMPOSITIONS

The invention relates to a concrete composition.

It is often desired to make articles such as fixtures, furniture and other accoutrements from materials that can be machined to have an aesthetically pleasing finish and that have good cutting, machining and mechanical properties, a low permeability and good abrasion resistance. Materials that might conventionally be used to make such articles include granite and marble. These materials are very expensive. Their mechanical properties are also often not ideal for such articles—they cannot be moulded and their flexural and compressive strengths are variable and often insufficient. It is therefore desirable to have a material that is cheap to manufacture, has good mechanical, machining and cutting properties, a high flexural and compressive strength, a low permeability and an aesthetically pleasing finish.

In accordance with the present invention, there is provided a concrete obtained through mixing a composition comprising the following constituents: a) 25 to 36% of a hydraulic binder, b) 32 to 47% of aggregate particles having a particle size of between 0.15 mm and 1 mm, c) 2 to 6% of pozzolanic reaction particles having a particle size of between 0.1 and 1 micron, d) up to 20% of a filler having a particle size between 1 micron and 20 microns, e) 0.6 to 2.5% of a dispersant, f) 0.22 to 1.5% of fibres, g) 0.02 to 0.06% of a foam control agent, and h) 7.3 to 9.4% of water, each percentages being the percentage by weight of the respective constituent relative to the sum of the weights of constituents a) to h)).

The following is a more detailed description of a preferred embodiment of the invention with reference to the examples, the invention not being limited to the embodiment or examples described.

The constituents from which the concrete composition of the present invention is made include a hydraulic binder, water, aggregate particles, pozzolanic reaction particles, a dispersant a foam control agent and a reactive and/or inert filler. In the preferred embodiment to be described, further constituents include a non-chloride set accelerator and pigment and the dispersant comprises a superplasticiser.

The hydraulic binder is 25 to 36%, preferably 30%, by weight of the weight of the sum of the constituents and is of the Portland cement type or a similar type. It is preferably Portland cement type 52.5R. Such a cement can be selected according to colour. If grey cement is selected, a suitable cement is Castle Rapid Hardening cement, which is supplied by Castle Cement. If white cement is selected, a suitable cement is Paragon Super White supplied by Cimsa, Turkey through Aggregate Industries Plc. A particle size distribution test of a sample of each of these cements gives the following data (using a Sypatec particle analyser):

| Maximum Particle Diameter (microns) | Rapid Hardening Portland Cement supplied by Castle Percentage of particles under the maximum | Paragon White Cement: Ship C 1138 Percentage of particles under the maximum |
|---|---|---|
| 175.0 | 100 | 100.00 |
| 147.0 | 100 | 100.00 |
| 123.0 | 100 | 100.00 |
| 103.0 | 100 | 100.00 |
| 87.0 | 99.98 | 100.00 |
| 73.0 | 99.53 | 99.97 |
| 61.0 | 98.59 | 99.85 |
| 51.0 | 97.17 | 99.36 |
| 43.0 | 95.28 | 97.98 |
| 36.0 | 92.51 | 95.02 |
| 30.0 | 88.59 | 90.36 |
| 25.0 | 83.45 | 84.51 |
| 21.0 | 77.60 | 78.14 |
| 18.0 | 72.01 | 72.12 |
| 15.0 | 65.13 | 65.01 |
| 12.5 | 58.19 | 58.52 |
| 10.5 | 51.69 | 53.05 |
| 9.0 | 46.35 | 48.75 |
| 7.5 | 40.84 | 44.14 |
| 6.0 | 35.35 | 39.01 |
| 5.0 | 31.72 | 35.27 |
| 4.3 | 29.14 | 32.47 |
| 3.7 | 26.83 | 29.92 |
| 3.1 | 24.26 | 27.09 |
| 2.6 | 21.74 | 24.36 |
| 2.2 | 19.34 | 21.75 |
| 1.8 | 16.40 | 18.55 |
| 1.5 | 13.76 | 15.64 |
| 1.3 | 11.73 | 13.39 |
| 1.1 | 9.41 | 10.78 |
| 0.9 | 6.76 | 7.77 |

The aggregate particles are 32 to 47%, preferably about 39%, by weight of the weight of the sum of the constituents and comprise particles of size substantially ranging from 0.15 mm to 1 mm and preferably 0.20 to 0.75 mm. The particles are generally rounded and generally do not have sharp points or edges. Sizes of particles are to be herein understood throughout as the length of the longest dimension of a particle. The aggregate particles consist of, for example, quartz, granite, basalt and silicon carbide of a combination of two or more of these. A suitable quartz is supplied by Garside Sands, Leighton Buzzard, Bedfordshire, UK and is known as Garside Number 60. Garside Number 60 is found to be particularly advantageous and has a particle size ranging from 0.71 mm to 0.25 mm.

The pozzolanic reaction particles are, for example, fumes produced in the silicon and zirconium industries for microsilicas. The pozzolanic reaction particles react chemically in the presence of moisture with the hydraulic binder to form compounds with cementitious properties. Including the pozzolanic reaction particles in the composition increases the compressive and flexural strengths of the concrete and reduces permeability, which results in a higher density concrete having improved mechanical, machining and cutting properties relative to conventional materials. It is between 2 and 6%, preferably between 3.4 and 4.4%, and preferably still about 3.9%, by weight of the sum of the weights of the constituents and comprises particles having a size ranging from 0.1 micron to 1 micron. Suitable fumes are type 940U and zirconia, supplied by Elkem Materials.

The composition comprises 7.3 to 9.4% and preferably 7.7% water. The ratio of water to hydraulic binder ranges from 0.21 to 0.38. The quantity of water added to the concrete composition is adjusted according to the characteristics of the other constituents—for example, depending upon the moisture content of any of the other constituents of the composition or the intended application of the concrete and is known in the art.

The filler is up to 20%, preferably 10 to 20%, and preferably still about 17%, by weight of the sum of the weights of the constituents. The pozzolanic reaction particles are preferably included in the composition as 18 to 28% by weight of the weight of the filler. The filler is a pozzolanically reactive filler or an inert filler or a mix thereof and comprises particles of size substantially ranging from 20 microns to 1 micron. The average particle size is preferably 4.4 microns. The reactive filler is a second material of pozzolanic nature and also reacts with the hydraulic binder in the presence of moisture to form compounds having cementitious properties. A suitable reactive filler is, for example, a ground crystalline quartz such as BML Micronised Silica Grade 20 supplied by Boud Minerals Limited, Marden, Kent. The reactive filler is less pozzolonically reactive than the Microsilica Elkem 940U. The use of a second material having pozzolanic reaction properties results in a concrete having higher compressive and flexural strengths and reduces permeability. Reducing permeability results in a denser concrete with improved finishing properties such as fewer pock marks and a more aesthetically pleasing finish.

The inert filler is, for example, a ground dolomitic power such as D45L supplied by Omya UK or limestone powder. The inert filler fills pore space with solid particles rather than water, thereby reducing the amount of water required per unit quantity of hydraulic binder. The strength is increased as the water required per unit quantity is reduced. Both reactive and inert fillers add fluidity to the composition, which aids mixing and moulding, and reduces the overall cost of the composition.

The fibres are made of polyvinyl alcohol and are between 0.22 and 1.5%, preferably about 0.75%, by weight of the weight of the sum of the constituents. The fibres have cross-sections ranging of 0.027 mm or 0.04 mm in diameter and are selected from fibres having cut lengths of 6, 8 and 12 mm. The fibres used can comprise a single length or a mix of different lengths. It has been found that a mix of 6 and 8 mm cut lengths can, with an appropriate mix of the other constituents, lead to particularly advantageous compressive and flexural strengths (see the Table below). The fibres used are of polyvinyl alcohol and are known as Kuralon II REC15 and Kuralon II RECS7, which are supplied by Kuraray Europe. Kuralon II REC15 and Kuralon II RECS7 have a high tensile strength (1600N/mm$^2$), respective diameters of 0.04 mm and 0.27 mm, possible elongation of 7%, respective Young's Moduli of 42 kN/mm and 39 kN/mm, a specific gravity of 13 and a thickness of 7 dtex. The fibres serve to strengthen an article composed of the concrete structurally, leading to more desirable mechanical properties, and to reduce instances of cracking.

The concrete composition advantageously comprises 0.6 to 2.5% of dispersant by weight to improve fluidity and workability of the composition. The dispersant is generally a superplasticiser and is added to the other constituents of the composition in combination with water. In the preferred embodiment, the dispersant comprises a first superplasticiser. This is a modified polycarboxylate and is added to the concrete composition in a quantity of 0.25 kg to 2.00 kg per 100 kg of hydraulic binder and is employed as a high range water reducer in the concrete composition. A suitable first superplasticiser is Premia 150 supplied by Chryso UK. If the composition is mixed in certain conditions such as during hot weather, it may be desirable to add a second superplasticiser. If added, the second plasticizer is added in a quantity of 0.3 kg to 3.00 kg per 100 kg of hydraulic binder. This second superplasticiser is also based on a modified polycarboxylate and is added to maintain the composition at a workable viscosity during such conditions. A suitable second plasticiser is Optima 203 supplied by Chyrso UK.

The concrete composition also advantageously includes a non-chloride set accelerator with low alkaline content to increase the early strength of the composition before and during setting and to expedite setting. Inclusion of such an accelerator also increases the strength of the set concrete. The set accelerator comprises between 0.34 and 0.68% by weight of the weight of the sum of the constituents and preferably about 0.62%. Such a set accelerator is Xel 650 supplied by Chryso UK. Xel 650 also serves to fluidise the composition, thereby lowering its viscosity and so reducing the need for water.

The concrete composition may also advantageously include colorants to pigment the set concrete. If added, such colorants comprise 0.15 to 2.4% by weight of the weight of the sum of the weights of the constituents. The pigment selected can be, for example, various natural and synthetic iron oxides, oxides of chromium, cobalt and titanium oxides, or a mixture thereof. Suitable colorants are supplied by Stoopen and Meuus in their Dragon range and are also supplied by Bayer.

The concrete composition preferably includes a foam control agent, preferably effective as both a defoamer and as an antifoaming agent. The foam control agent removes entrapped air leading to a concrete composition that can be pumped more efficiently and trowelled more easily. The foam control agent also reduces shrinkage on setting of the concrete composition, thereby improving strength properties, and improves permeability due to a reduction of porosity caused by entrapped air. The foam controller agent is added to the concrete composition to comprise between 0.02 and 0.06% by weight of the sum of the weights of the constituents. The amount of foam control agent added is preferably 0.13% by weight of the weight of the hydraulic binder. A suitable foam control agent is DF300P supplied by eChem.

The preparation of the concrete requires the following steps:

In a first step, the hydraulic binder, the aggregate, the pozzolanic reaction particles, the filler, the foam control agent and, if desired, the pigment are dry mixed together until the concentration of each constituent is even throughout the mixture. A known type of planetary mixer which shears the mix is typically used for this purpose. In a second step, a combination of the first superplasticiser and the water is added to the mixture. In a third step the non-chloride set accelerator is added to the mixture. The fibres are then added in a fourth step and mixed until the concentration of fibres is even throughout the mixture.

The constituents mixed in the first step are preferably mixed for 2 minutes. If pigment is to be included in the mix, it is added in the first step and mixed together with the other constituents in this step. In the second step, the mix is preferably mixed for between 10 and 12 minutes. In the third step, the mixture is preferably mixed for 2 minutes. In the fourth step, the mix is preferably mixed for 2 minutes.

The mixture obtained at the end of fourth step is poured into a mould and vibrated for up to 15 minutes, depending on the frequency and amplitude of the vibration used, to remove air bubbles and thus reduce porosity. The frequency and amplitude of the vibration is adjusted in a known fashion depending upon the desired application of the concrete.

Once the mould is filled, the surface of the mix is treated in a conventional way with, for example, a water based or solvent based curing product that produces a membrane over the surface of the mixture. The membrane inhibits evaporation of water from the mixture at the surface. The concentration of water throughout the mixture thereby remains even. The mixture is left in the mould to stand for 72 hours. It is then removed from the mould and placed in an atmosphere of at least 70%, preferably 95%, relative humidity. It is then preferably placed within a temperature controlled water circulation tank for further curing.

The following table indicates test results for concrete made respectively from six different compositions, each composition having a different amount of at least one constituent.

ticiser combination added derives from solid, 70% from water and 60% of the set accelerator derives from solid, 40% from water. In these mixes the Premia 150 has a specific gravity of 1.06 and the set accelerator has a specific gravity of 1.45.

Concrete made from the composition described above has high flexural and compressive strengths compared to conventional concrete and has excellent cutting, machining and finishing properties. The concrete preferably has a compressive strength of at least 150 MPa and a flexural strength of at least 14 N/mm$^2$. The concrete also has a high resistance to abrasion and polishes to an aesthetically pleasing finish.

The concrete achieves these properties through the packing of the particles. As the hydraulic binder, aggregate, filler and pozzolanic reaction particles are of different sizes, the particles arrange themselves to be optimally packed for the strengths and properties mentioned.

|  | Mix Reference | A | B | C | D | E | F |
|---|---|---|---|---|---|---|---|
| Mix Design Details | Ordinary Portland Cement (OPC) (kg/m$^3$) Hydraulic Binder Paragon White 52.5R | 690 | 690 | 690 | 690 | 690 | 690 |
|  | Pozzolan Micro-silica (kg/m$^3$) Elkem 940U | 90 | 90 | 90 | 90 | 90 | 90 |
|  | Filler Quartz Powder (kg/m$^3$) BML Micronised Silica Grade 20 | 390 | 390 | 390 | 390 | 390 | 390 |
|  | Garside C60 Sand kg/m$^3$ Aggregate | 900 | 900 | 900 | 900 | 900 | 900 |
|  | Kuralon 2 Fibre (REC15)-Length (mm) | 8/6 | 8/6 | 8 | 6 | 8 | 6 |
|  | Fibre Dosage (kg/m$^3$) | 8.83/8.83 | 8.83/8.83 | 17.65 | 17.65 | 17.65 | 17.65 |
|  | Water (kg/m$^3$) | 180 | 180 | 180 | 180 | 180 | 180 |
|  | Superplasticiser Premia 150 Quantity (kg/m$^3$) | 50 | 50 | 50 | 50 | 50 | 50 |
|  | Set Accelerator Quantity (kg/m$^3$) | — | 14.5 | — | — | 14.5 | 14.5 |
| Flexural Strength N/mm$^2$ | 1 day | 15.7 | 14.4 | 14.7 | 14.2 | 17.8 | 15.0 |
|  | 5 day | — | — | — | — | — | — |
|  | 7 day | 15.8 | 19.4 | 15.4 | 18.2 | 16.3 | 14.3 |
| Compressive Strengths (N/mm$^2$) | 1 day | 62.8 | 65.4 | 64.6 | 64.1 | 60.3 | 63.1 |
|  | 7 day | 103.9 | 105.0 | 96.1 | 97.1 | 98.0 | 99.5 |
|  | 28 day | 150 | 150 | 150 | 150 | 150 | 150 |

These tests show the flexural strengths and compressive strengths of the respective concrete obtained through mixing Mixes A to F. The composition was removed from the mould after twenty four hours and the tests at one day were conducted. The composition was then placed in 95% relative humidity for three days and then stored underwater at 20 degrees centigrade for a further twenty-four days. The composition was removed from the underwater for tests at seven days from removal from the mould. Further tests were conducted at twenty-eight days after removal from the mould. The concrete composition tested was a rectangular prism of dimensions 40 mm by 160 mm by 160 mm. Where 150 MPa compressive strength is shown, this is not a true maximum value—this is the maximum measurement available with the laboratory equipment used. Mixes A to F also all include 0.02 to 0.06% by weight of foam control agent. In these mixes, the set accelerator and the superplasticiser are added to the composition in combination with water—30% of the superplas- The packing of the particles also allows for improved hydration of the composition during mixing, which results in a high density concrete of low porosity with good impermeability. The use of the defoaming agent and the use of vibration during casting further reduce the porosity and concrete can therefore be made having a cross-section which is substantially free of air holes. The packing of the particles results in a concrete with excellent abrasion resistance properties when compared with conventional concretes.

The optimal packing of the particles also results in a concrete having low friability, which also allows the concrete to be easily machined, shaped and polished. The lack of air holes and low friability allow the possibility of machining and allow a substantially smooth cut surface, free of part air holes, to be machined.

The fibres improve the flexural and compressive strength of the concrete and also reduce friability. The concrete made also has a high ductility relative to conventional concretes, marble or granite permitting thin sections of the concrete to be laid on uneven surfaces with a reduced likelihood of cracking when compared to conventional concretes, marble or granite.

Accordingly, many applications exist in which marble and granite, amongst others, are conventional materials and where the use of the concrete of the present invention, which generally has higher ductility, lower friability, higher compressive and resistive strengths, higher abrasion resistance as well as an aesthetically pleasing appearance is advantageous. Such applications especially include those where the material employed is in slab form such as table and kitchen surfaces, flooring, etc. Concrete is also advantageously workable whereas, for example, marble and granite are not. The concrete described above can also be provided much more cheaply than many conventional materials such as marble or granite.

It will be appreciated that there are a number of variations that can be made to the concrete composition described above and the possible mixes of constituents are not limited to the examples. The fibres may have various geometries. The roughness of the fibres may also be advantageously adjusted. The fibres do not have to be the cut lengths or diameters mentioned—they could have any length from 2 mm to 40 mm, although they are preferably 4 mm to 14 mm in length, and have diameter from 0.01 to 0.1 mm. They also do not have to be of polyvinyl alcohol—they could be polyacrylonitrile, high density polyethylene, aramid polyamid, polypropylene, Kevlar™, carbon fibre or other suitable materials. Metal fibres are also suitable, although in the manufacture of some articles such as those where, should the article break metal fibres might pose a safety risk, non-metal fibres are preferred. Polyvinyl alcohol fibres are preferred in alkaline environments in which other fibres might corrode. In addition, polyvinyl alcohol fibres have a high tensile strength (about 1600 N/mm$^2$), do not corrode as metal fibres might, are approximately a sixth the weight of steel fibres and are not liable to cause sparks if a rough material is rubbed on a fibrous surface. If polyvinyl alcohol fibres protrude from a surface following machining, the fibres can be burnt off without producing significant toxic fumes as the fibre is composed of carbon, hydrogen and oxygen compounds. Accordingly, while other materials have some of these features, polyvinyl alcohol fibres are preferred.

If an aggregate is chosen such that the set concrete would not be sufficiently hard, a lithium based surface hardening agent may be used. In particular, such an agent may be used if the aggregate is quartz. Also, an aggregate different to the aggregate in the mix may be added to a surface of a slab on moulding to enhance abrasion resistance and to alter the appearance of the slab.

The hydraulic binder does not have to be of the Portland cement type. The hydraulic binder could be a calcium aluminate based cement or any hydraulic binder based on blast furnace slag or combination thereof.

The pozzolanic reaction particles or the reactive filler could be partially replaced with pulverised fuel ash or ground granulated blast furnace slag.

In the examples above, one or two superplasticisers are used. A combination of any number of superplasticisers or other dispersants might alternatively be used.

The concrete may also include other additives such as further dispersants, antisweating agents and antideposition agents.

Times for mixing and curing may be altered and in particular lengthened and a satisfactory result still obtained. Methods for curing the concrete composition are known in the art and the periods for which the concrete is cured can be varied in accordance with known principles.

Concrete made according to the present invention is advantageous in the manufacture of articles such as fixtures, furniture and other accoutrements including but not limited to household surfaces, sinks, basins, baths, wall tiles, machined floor tiles, shower trays, chairs, tables, radiators, works of art and prefabricated elements for machining. It is also envisaged to produce pre-prepared bags of the composition (excluding water) for the home improvements market.

The invention claimed is:

1. A concrete obtained through mixing a composition comprising the following constituents:
   a) 25 to 36% of a hydraulic binder,
   b) 32 to 47% of aggregate particles having a particle size of between 0.15 mm and 1 mm,
   c) 2 to 6% of pozzolanic reaction particles having a particle size of between 0.1 and 1 micron,
   d) up to 20% of a filler having a particle size between 1 micron and 20 microns,
   e) 0.06 to 2.5% of a dispersant,
   f) 0.22 to 1.5% of fibres,
   g) 0.02 to 0.06% of a foam control agent, and
   h) 7.3 to 9.4% of water,
each percentages being the percentage by weight of the respective constituent relative to the sum of the weights of constituents a) to h).

2. A concrete composition according to claim 1 wherein the particles of the filler have an average particle size of 4.4 microns.

3. A concrete composition according to claim 1 wherein said filler comprises partially or wholly pozzolanically reactive particles, which react on mixing with said hydraulic binder.

4. A concrete composition according to claim 1 wherein said filler is partially or wholly an inert filler.

5. A concrete composition according to claim 1 wherein said dispersant comprises one or more superplasticizers.

6. A concrete composition according to claim 1 wherein said dispersant includes a first superplasticizer, which constitutes 0.06 to 0.72% by weight of the weight of the sum of the constituents a) to h).

7. A concrete composition according to claim 6 wherein said dispersant includes a second superplasticizer, which constitutes 0.07 to 1.08% by weight of the weight of the sum of the constituents a) to h).

8. A concrete composition according to claim 1 and comprising a further constituent of a non-chloride set accelerator, which constitutes 0.34 to 0.68% by weight of the weight of the sum of all the constituents.

9. A concrete composition according to claim 1 and comprising a further constituent of pigment, which constitutes 0.15 to 2.4% by weight of the weight of the sum of all the constituents.

10. A concrete composition according to claim 1 wherein the average weight of foam control agent is 0.13% by weight of the weight of the hydraulic binder weight.

11. A concrete composition according to claim 1 wherein the fibres are made of polyvinyl alcohol.

12. A concrete composition according to claim 1 wherein said fibres have a length of between 4 mm and 14 mm.

13. A concrete composition according to claim 1 wherein said fibres are selected from cut lengths of 6, 8 and 12 mm.

14. A method for producing the concrete according to claim 1 through mixing a composition comprising the constituents a) to h).

15. A method according to claims 14 wherein the hydraulic binder, aggregate particles, the pozzolanic reaction particles, the filler and the foam control agent are dry mixed together, then a combination of water and a superplasticiser are added and mixed, then the fibres are added and mixed, and then the composition is cast in a mould.

16. A method according to claim 15 wherein a non-chloride set accelerator is added after the combination of water and the superplasticiser and before the fibres and mixed.

17. A method according to claim 15 wherein a pigment is mixed with the hydraulic binder, aggregate particles, the pozzolanic reaction particles, the filler and the foam control agent.

* * * * *